United States Patent
Aida

(10) Patent No.: US 7,710,851 B2
(45) Date of Patent: May 4, 2010

(54) OPTICAL DISC APPARATUS

(75) Inventor: Kazutoshi Aida, Osaka (JP)

(73) Assignee: Panasonic Corporation, Osaka (JP)

( * ) Notice: Subject to any disclaimer, the term of this patent is extended or adjusted under 35 U.S.C. 154(b) by 618 days.

(21) Appl. No.: 11/665,075

(22) PCT Filed: Aug. 21, 2006

(86) PCT No.: PCT/JP2006/316318

§ 371 (c)(1),
(2), (4) Date: Apr. 11, 2007

(87) PCT Pub. No.: WO2007/037076

PCT Pub. Date: Apr. 5, 2007

(65) Prior Publication Data

US 2009/0207719 A1    Aug. 20, 2009

(30) Foreign Application Priority Data

Sep. 28, 2005   (JP)   ............................. 2005-282078

(51) Int. Cl.
*G11B 3/00* (2006.01)
(52) U.S. Cl. ..................................... 369/134
(58) Field of Classification Search ................. 369/134, 369/65, 128
See application file for complete search history.

(56) References Cited

U.S. PATENT DOCUMENTS

2007/0280059 A1* 12/2007 Cheng et al. ............. 369/44.25
2007/0280079 A1* 12/2007 Cheng et al. ................ 369/59.1

FOREIGN PATENT DOCUMENTS

| JP | 4-178025 A | 6/1992 |
|---|---|---|
| JP | 5-182104 A | 7/1993 |
| JP | 2001-210018 A | 8/2001 |
| JP | 2001-243714 A | 9/2001 |
| WO | WO 03/077248 A1 | 9/2003 |

* cited by examiner

*Primary Examiner*—Allen T Cao
(74) *Attorney, Agent, or Firm*—McDermott Will & Emery LLP

(57) ABSTRACT

A variable gain amplifier (203: VGA) for amplifying an amplitude of a signal extracted by a pickup (202), an A/D converter (204) for converting the amplified signal into digital, and an amplitude detecting circuit (206) for detecting amplitude information from the digital information, are provided. A gain control circuit (205) for calculating a control value for the VGA (203) is calculated from the detected amplitude information, and an envelope generating circuit (207) for executing an operation of absorbing transfer characteristics of the VGA (203) from the control value for the VGA (203) and the amplitude information, are provided to generate an envelope extracted by the pickup (202). When the characteristics of the VGA (203) vary, a degree of the variation is calculated from the amplitude information of the signal extracted by the pickup (202) and amplitude information obtained by fixing the control value for the VGA (203), and characteristic correction is executed.

11 Claims, 8 Drawing Sheets

OPTICAL DISC APPARATUS

RELATED APPLICATIONS

This application is the U.S. National Phase under 35 U.S.C. §371 of International Application No. PCT/JP2006/316318, filed on Aug. 21, 2006, which claims priority of JP 2005-282078, filed on Sep. 28, 2005, the disclosures of which Application is incorporated by reference herein.

TECHNICAL FIELD

The present invention relates to an optical disc apparatus for recording and reproduction of an optical disc medium. More particularly, the present invention relates to the field of signal processing which has a function of generating an envelope of a reproduced signal.

BACKGROUND ART

At present, the market of optical disc apparatuses is growing, and there is a demand for a high-stability and high-quality reproduced signal in the optical disc apparatus. When information is extracted from an optical disc medium, the amplitude of a signal extracted by a pickup is altered if there is a defect in the optical disc medium, or dust, a fingerprint or the like is attached on the optical disc medium. The amplitude of a signal extracted by a pickup is also altered due to a stress on an optical disc apparatus (e.g., defocusing, tilt, etc.), or a variation in reflectance, modulation factor or the like of an optical disc medium itself.

Therefore, conventionally, a VGA (Variable Gain Amplifier) is provided before binary data is generated, so as to cause an amplitude value to be constant to stably generate binary data, thereby providing high-quality reproduced information. Also, it is necessary to detect an envelope of a signal extracted from a pickup so as to use the envelope for pickup focus position learning, medium record/unrecord determination, or the like. However, since the envelope of a signal extracted by a pickup cannot be reproduced from a signal whose amplitude has been caused to be constant after the VGA, conventional optical disc apparatuses detect an envelope from a signal before the VGA (see Patent Document 1).

It is contemplated that an ADC (Analog-to-Digital Converter) is added after the VGA so as to exploit a digital signal processing technique, such as PRML (Partial Response Maximum Likelihood) or the like, and thereby further improve the accuracy of binary data. Further, as a miniaturization process progresses, the circuit scale of an analog portion tends to be dominant as compared to the circuit scale of a digital portion. Therefore, a digital circuit configuration leads to a reduction in cost.

Patent Document 1: Japanese Patent Unexamined Publication No. 2001-243714

DISCLOSURE OF THE INVENTION

Problems to be Solved by the Invention

However, when the configuration for detecting the envelope as described above is replaced with a digital circuit, which is suitable for miniaturization, an envelope detection circuit must be comprised of an analog circuit, or an ADC must be prepared for each of envelope detection and binary data generation (i.e., a total of two ADCs) to achieve the digital configuration. As a result, the circuit scale of the analog portion is not much reduced, leading to high cost.

The present invention is provided in view of the above-described problems. An object of the present invention is to provide an optical disc apparatus which generates the envelope of a signal extracted by a pickup from a signal after a VGA, thereby reducing an analog circuit, resulting in a reduction in cost.

Solution to the Problems

To achieve the object, the optical disc apparatus of the present invention has the following features. Specifically, the optical disc apparatus comprises an amplitude control means for stabilizing an amplitude of a signal extracted by a pickup, an A/D conversion means for subjecting a signal whose amplitude has been controlled to digital sampling, a binary data generating means for generating binary reproduced data from the digital sampling signal, an amplitude detecting means for detecting an amplitude of the digital sampling signal, and an envelope generating means for extracting an envelope of the pickup from the detected digital amplitude. The amplitude control means includes an amplification means (VGA), a gain control means for determining an amplitude increase or decrease amount of the amplification means, a gain holding means for holding the control of the amplification means, and a gain fixing means for fixing the control of the amplification means.

Also, the envelope generating means includes a unity gain control value setting means for setting information for causing the gain of the amplification means to be one or m (m is not limited to integers), and a gain tilt correction value setting means for setting a gain tilt of the amplification means, and obtains the envelope of the pickup from these values and a control value for the amplification means. When transfer characteristics of the amplification means are known, a unity gain control value and a gain tilt correction value can be set from the transfer characteristics. If allowance is made to some extent for a variation so as to reduce the difficulty in designing the amplification means, the process of setting the unity gain control value and the gain tilt correction value can be carried out using a variation correcting procedure.

When the variation correcting procedure is carried out, the output amplitude of the pickup is required. Therefore, a system for measuring the output amplitude of the pickup without via the amplification means, and a means for holding the output amplitude of the pickup in the predetermined area, are provided. Note that a system controller may be used to hold the pickup output amplitude. Next, the output amplitude of the pickup is passed through the amplification means while the control value of the amplification means is fixed, and in this state, the digital amplitude value is detected. A control value of the amplification means which causes the read digital amplitude value to be equal to the held pickup output amplitude value, is searched for. The eventually found control value is set as a unity gain control value. Further, in the state, the control value of the amplification means is varied so as to obtain a control value which has a ratio of 6 [dB] with respect to the pickup output amplitude. The obtained value is set as a gain tilt correction value. Note that the ratio does not necessarily need to be fixed to 6 [dB].

EFFECT OF THE INVENTION

According to the optical disc apparatus of the present invention, an envelope of a signal extracted by a pickup from a signal after a VGA, thereby making it possible to suppress the circuit scale of an analog portion to be a minimum level, resulting in low cost.

Figure 1:
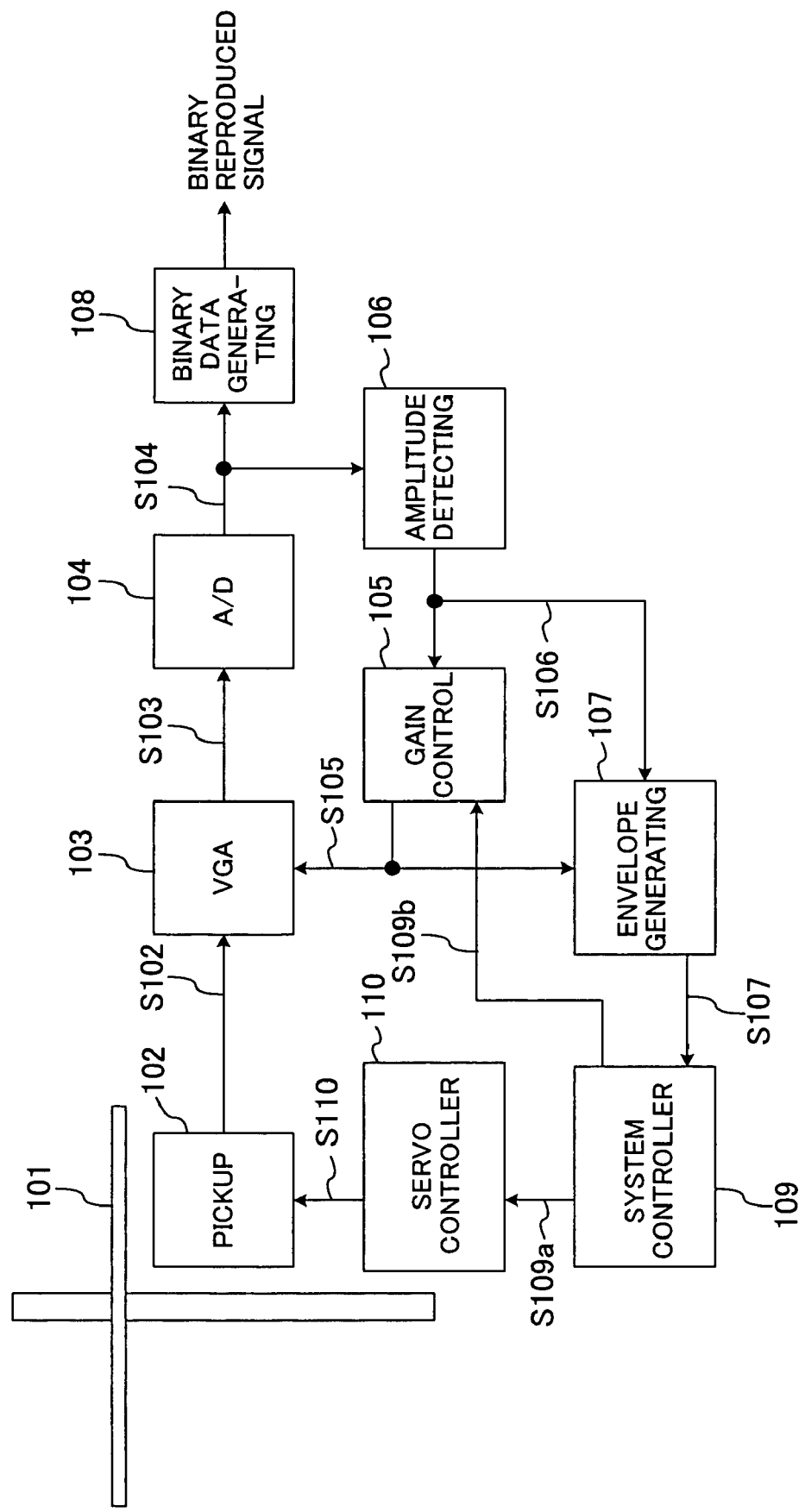
FIG. 1 is a block diagram illustrating a configuration of an optical disc apparatus according to Embodiment 1 of the present invention.

DESCRIPTION OF THE REFERENCE CHARACTERS 101, 201 optical disc medium
102, 202 pickup
103, 203 VGA
104, 204 A/D converter (ADC)
105, 205 gain control circuit
106, 206 amplitude detecting circuit
107, 207 envelope generating circuit
108, 208 binary data generating circuit
211 gain fixation value
501 unity gain control value
502 gain tilt correction value
504 splitting circuit
506 logarithm table
507 bit shift operation circuit
508 subtractor
509 divider

BEST MODE FOR CARRYING OUT THE INVENTION

Hereinafter, embodiments of the present invention will be described in detail with reference to the accompanying drawings.

Embodiment 1

FIG. 1 is a block diagram illustrating a configuration of an optical disc apparatus according to Embodiment 1 of the present invention. In FIG. 1, 101 indicates an optical disc medium, 102 indicates a pickup for extracting a signal recorded on the optical disc medium, 103 indicates a VGA for increasing or decreasing an amplitude of the signal extracted by the pickup 102, and 104 indicates an A/D converter for subjecting the signal increased or decreased by the VGA 103 to analog-to-digital conversion. 106 indicates an amplitude detecting circuit for detecting the amplitude of the signal which has been converted into digital in 104, 105 indicates a gain control circuit for controlling the VGA 103 so that the detected amplitude is caused to be constant, 107 indicates an envelope generating circuit for generating an envelope which has a high level of correlation with the signal extracted by the pickup 102 from a control value for the VGA 103 which is the output of the gain control circuit 105 and an amplitude value which is the output of the amplitude detecting circuit 106, 108 indicates a binary data generating circuit for generating a binary reproduced signal, 109 indicates a system controller for determining a magnitude of the envelope and controlling a servo controller 110 and the gain control circuit 105, and 110 indicates a servo controller for controlling a focusing state and a tracking state of the pickup 102. Also, S102 indicates a signal based on returning light of the optical disc medium 101 extracted by the pickup 102, S103 indicates a signal obtained by increasing or decreasing an amplitude of S102, S104 indicates a signal obtained by converting S103 into digital, S105 indicates a gain control value for controlling the VGA 103, S106 indicates amplitude information of the digital converted signal, S107 indicates an envelope signal, S109a indicates a control signal for the servo controller 110, S109b indicates a hold signal for the gain control circuit 105, and S110 indicates a focusing and tracking drive signal.

Figure 2:
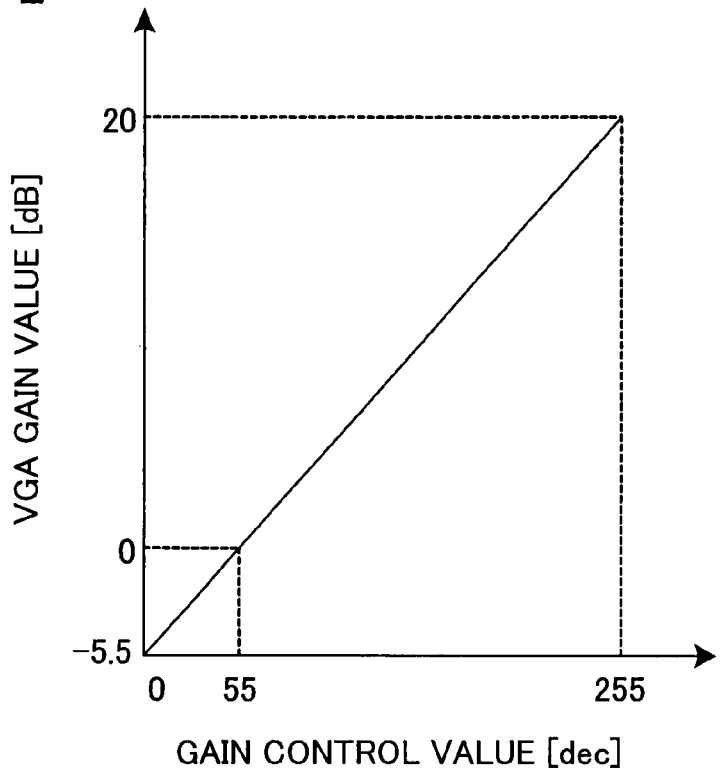
FIG. 2 is a diagram illustrating exemplary transfer characteristics of a VGA in FIG. 1.

FIG. 2 is a characteristic diagram illustrating characteristics of the VGA 103 in which an amplitude control amount varies, depending on the gain control value S105. Hereinafter, for example, it is assumed that the VGA 103 can perform an amplitude control of −5.5 [dB] to 20 [dB] using 256 levels of gain control value.

Figure 3:
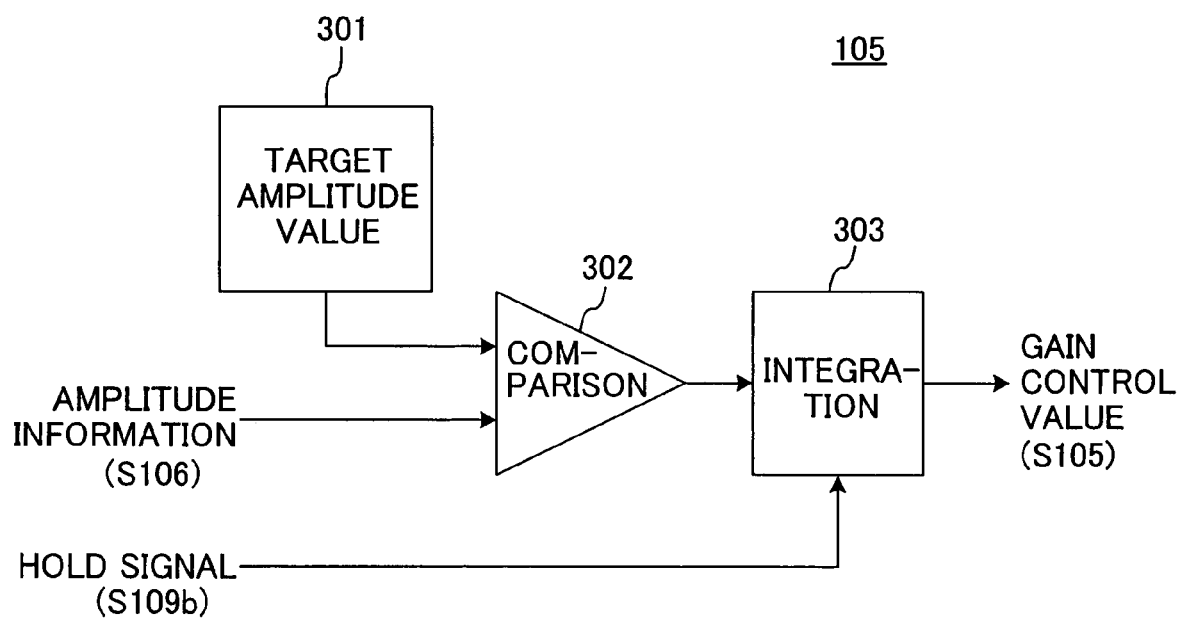
FIG. 3 is a block diagram illustrating a configuration of a gain control circuit of FIG. 1.

FIG. 3 is a block diagram illustrating a detailed configuration of the gain control circuit 105. In FIG. 3, 301 indicates a target amplitude value which defines a target value of amplitude information, 302 indicates a comparison circuit for comparing the current amplitude information S106 with the target amplitude value 301, and 303 indicates an integration circuit for smoothing the result of the comparison. When receiving the hold signal S109b, the integration circuit 303 holds the current gain control value S105.

Figure 4:
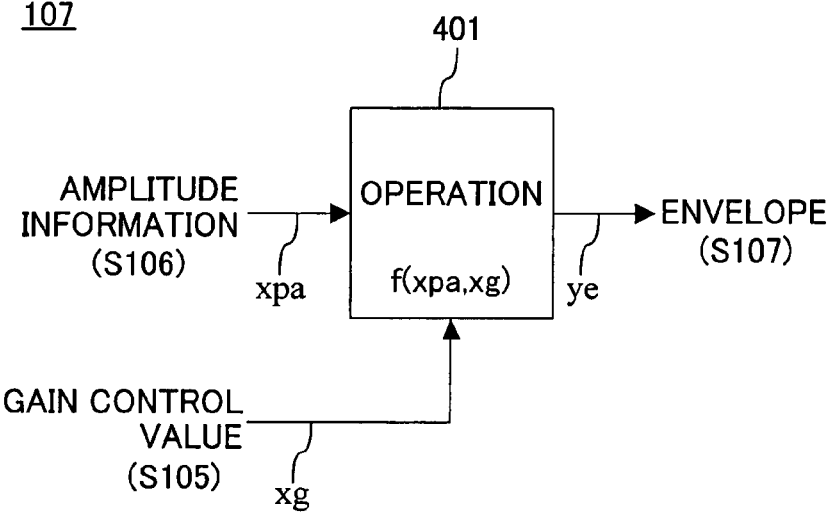
FIG. 4 is a diagram schematically illustrating an envelope generating circuit of FIG. 1.

FIG. 4 is a block diagram illustrating an input-output relationship of the envelope generating circuit 107. In FIG. 4, 401 indicates an operation circuit for calculating the envelope S107 from the amplitude information S106 and the gain control value S105, i.e., executes an operation of ye=f(xpa, xg) where xpa represents amplitude information, xg represents a gain control value, and ye represents an envelope. Note that, as f(xpa, xg), a function of absorbing the characteristics of the VGA 103 of FIG. 2 is selected.

Figure 5:
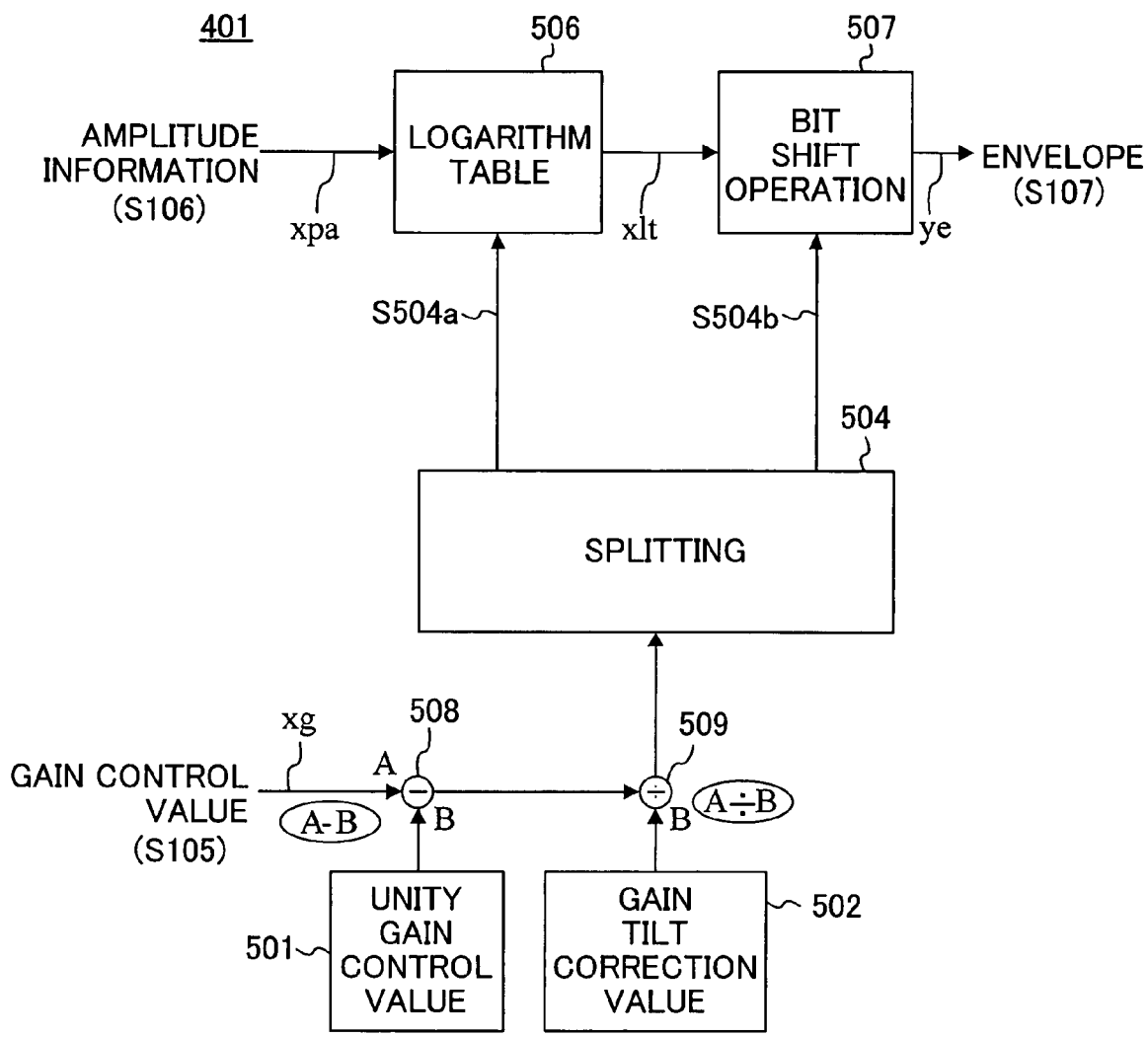
FIG. 5 is a block diagram illustrating a detailed configuration of the envelope generating circuit of FIG. 4.

FIG. 5 illustrates a detailed exemplary configuration of the operation circuit 401. In FIG. 5, 501 indicates a unity gain control value for setting a gain control value which causes the VGA 103 to have a gain of one, 508 indicates a subtractor for calculating a difference between the gain control value S105 and the unity gain control value 501, 502 indicates a gain tilt correction value which sets a slope in transfer characteristics of the VGA 103, 509 indicates a divider for dividing the output of the subtractor 508 by the gain tilt correction value 502, and 504 indicates a splitting circuit for splitting the result of the division into a fractional part S504a and an integer part S504b. 506 indicates a logarithm table for obtaining an operation value from the fractional part S504a of the result of the division and subjecting the amplitude information S106 to a logarithmic operation, and 507 indicates a bit shift operation circuit for obtaining an operation value from the integer part S504*b* of the result of the division and subjecting and amplifying or attenuating the output of the logarithm table 506.

Figure 6:
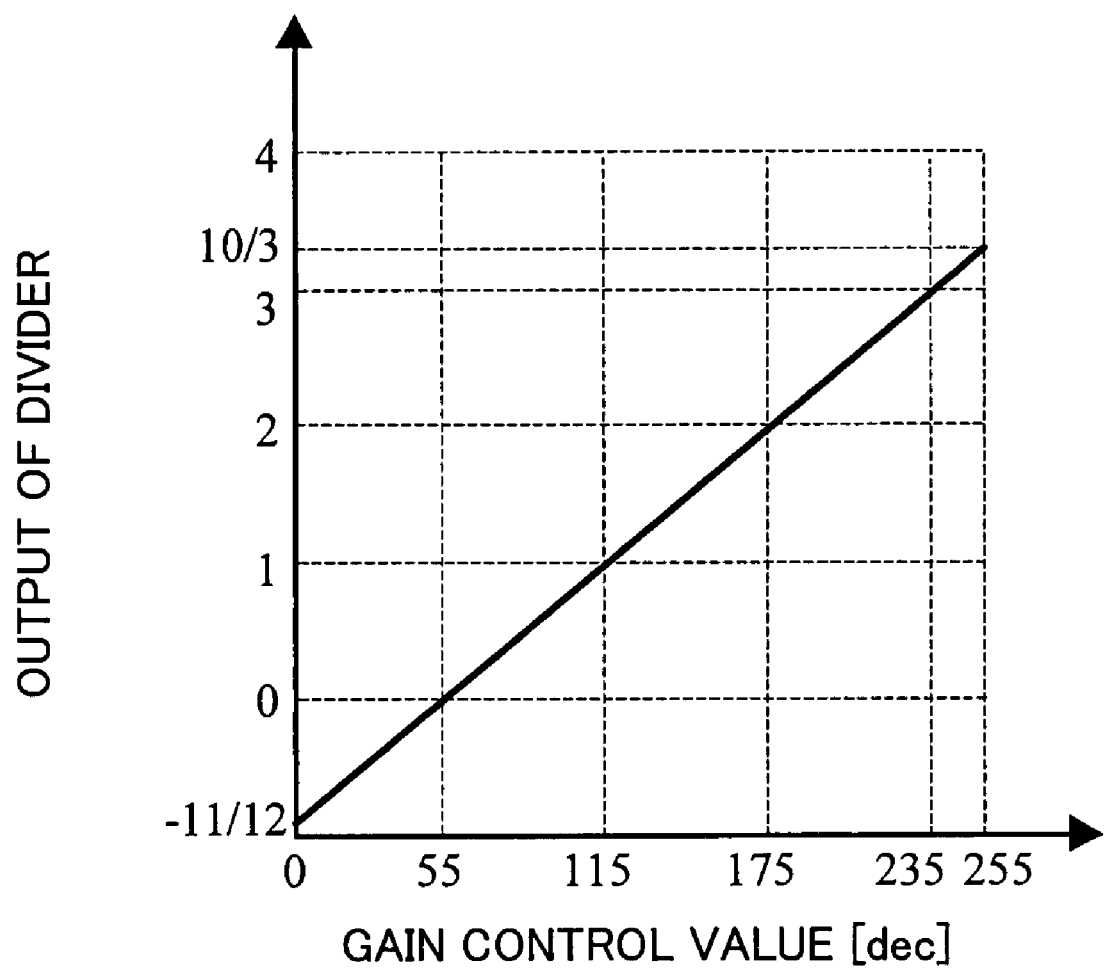
FIG. 6 is a diagram illustrating an exemplary output of a divider of FIG. 5.

FIG. 6 illustrates output characteristics of the divider 509.

FIGS. 7(*a*) and 7(*b*) illustrate output characteristics of the splitting circuit 504. FIG. 7(*a*) illustrates an output of the integer part, and FIG. 7(*b*) illustrates an output of the fractional part.

A flow of a signal and an outline of an envelope generating operation will be described with reference to FIGS. 1, 2, 3, 4 and 5. Initially, a signal extracted by the pickup 102 is transferred via the VGA 103 to the A/D converter 104, in which the signal is converted into a digital signal. An amplitude of the digital signal is detected by the amplitude detecting circuit 106, and the gain control value S105 is generated from the detected amplitude information by the gain control circuit 105, and S105 is fed back to the VGA 103. This flow will be described.

The signal S102 extracted by the pickup 102 is assumed to be a signal having an amplitude xp. When the gain control value S105 for controlling the VGA 103 has a value xg, an amplitude xpa of the signal S103 input to the A/D converter 104 is amplified or attenuated by 25.5/255×(xg−255×5.5/25.5) [dB] in accordance with the characteristics of the VGA 103 of FIG. 2. Therefore, the amplitude xpa of S103 is represented by:

$$xpa = 10^\wedge[25.5(xg - 255 \times 5.5/25.5)]/(255 \times 20) \times xp$$
$$= 10^\wedge[(xg - 55)/200] \times xp$$

where "^" represents a power operation (the same is true of the description below). S103 is converted into a digital value by the A/D converter 104, but the amplitude information is not lost. In other words, the amplitude of the amplitude information S106 detected by the amplitude detecting circuit 106 has the same value xpa as that of the amplitude of S103. The amplitude information S106 is input to the comparison circuit 302 of FIG. 3, and is compared with the target amplitude value 301 which defines the amplitude value of S106. The result of the comparison by the comparison circuit 302 is smoothed into the gain control value S105 by the integration circuit 303. When the amplitude information S106 is smaller than the target amplitude value 301, the gain control value S105 is shifted in a direction which amplifies the gain of the VGA 103. On the other hand, when the amplitude information S106 is larger than the target amplitude value 301, the gain control value S105 is shifted in a direction which attenuates the gain of the VGA 103.

By repeatedly executing the above-described operation, the target amplitude value 301 and the amplitude information S106 eventually become equal to each other, transitioning to a steady state. When the target amplitude value 301 is set to be trg, the amplitude information S106 in the steady state is trg. Even when the amplitude of S102 extracted by the pickup 102 varies, S103 has the constant amplitude value trg in accordance with the above-described flow. Since S103 is constant, the dynamic range of the A/D converter 104 can be effectively utilized, and S104 is also stable. The binary data generating circuit 108, which receives the stable S104, can output a binary reproduced signal with high precision.

Next, the envelope generation will be described. The envelope of the signal S102 extracted by the pickup 102 may be used for focus position learning of the pickup 102 or record/unrecord determination of a writable optical disc medium. However, when an envelope is simply generated from S103, S104 and S106 having a steady amplitude, focus position learning or record/unrecord determination may not be carried out. However, by using the envelope generating circuit 107 of FIGS. 4 and 5 which receives the gain control value S105 and the amplitude information S106, an envelope corresponding to S102 can be reliably detected.

A function of absorbing the characteristics of the VGA 103 of FIG. 2 is applied to the operation circuit 401 of FIG. 4. The characteristics of the VGA 103 can be determined as appropriate, depending on designer's purposes, and therefore, are known. When the amplitude information is represented by xpa, the gain control value is represented by xg, and the envelope is represented by ye, the operation of absorbing the characteristics of FIG. 2 is determined as:

$$f(xpa,xg)=1/(10^\wedge((xg-55)/200)).$$

According to the function above, the envelope ye is represented by:

$$ye = xpa/(10^\wedge((xg - 55)/200))$$
$$= 10^\wedge((xg - 55)/200) \times xp/(10^\wedge((xg - 55)/200))$$
$$= xp.$$

Thereby, the amplitude of the signal S102 extracted by the pickup 102 can be restored. Note that the process may be implemented either by software or by hardware.

The envelope generation will be described in more detail with reference to FIG. 5. Regarding the VGA gain amount of FIG. 2, a value which causes the VGA gain amount to be one is selected as the unity gain control value 501. According to the characteristics of FIG. 2, the unity gain control value is 55 [dec]. When the gain control value is represented by xg, the output of the subtractor 508 is xg−55. The gain tilt correction value 502 is a target for setting a gain control value which is required to provide a change of 6 [dB], and can be obtained, according to the characteristics of FIG. 2, by:

$$255[dec]:(\text{gain control value})[dec] = 25.5[dB]:20 \times \log_{10}(2)[dB].$$

Specifically, the gain tilt correction value 502 is 200×log$_{10}$(2). Therefore, the divider 509 outputs (xg−55)/(200×log$_{10}$(2)). The result of the operation by the divider 509 is split by the splitting circuit 504 into the signal S504*a* for controlling a small gain and the signal S504*b* for controlling a large gain. When it is assumed that S504*a* is the fractional part of the divider 509 and S504*b* is the integer part of the divider 509, it is convenient in terms of circuit configuration. When the fractional part has a value xf, the logarithm table 506 subjects the amplitude information S106 having the value xpa to an amplitude correcting process represented by:

$$xlt=2^\wedge(1-xf) \times xpa$$

where xlt represents the resultant output amplitude.

Note that the fractional part xf of the result of the division is 0≦xf<1. The output amplitude xlt of the logarithm table 506 is further subjected to an amplitude operation by the bit shift operation circuit 507. The bit shift operation circuit 507 executes an amplitude operation larger than that of the logarithm table 506. The amplitude correcting process is represented by:

$$ye = 2^{\wedge}(-(1+xi)) \times xlt$$

$$= xpa/2^{\wedge}(xf+xi)$$

where ye represents the output of the bit shift operation circuit 507, and xi represents the integer part of the result of the division.

xf+xi is the sum of the fractional part and the integer part of the splitting circuit 504, and is equal to the output result of the divider 509. Specifically, $$ye = xpa/2^{\wedge}((xg-55)/(200 \times \log_{10}(2)))$$

$$= 10^{\wedge}[(xg-55)/200] \times xp/2^{\wedge}((xg-55)/(200 \times \log_{10}(2)))$$

$$= xp.$$

Thus, the amplitude value of the output of the bit shift operation circuit 507 is equal to the amplitude value of the output of the pickup 102.

Figure 7A:
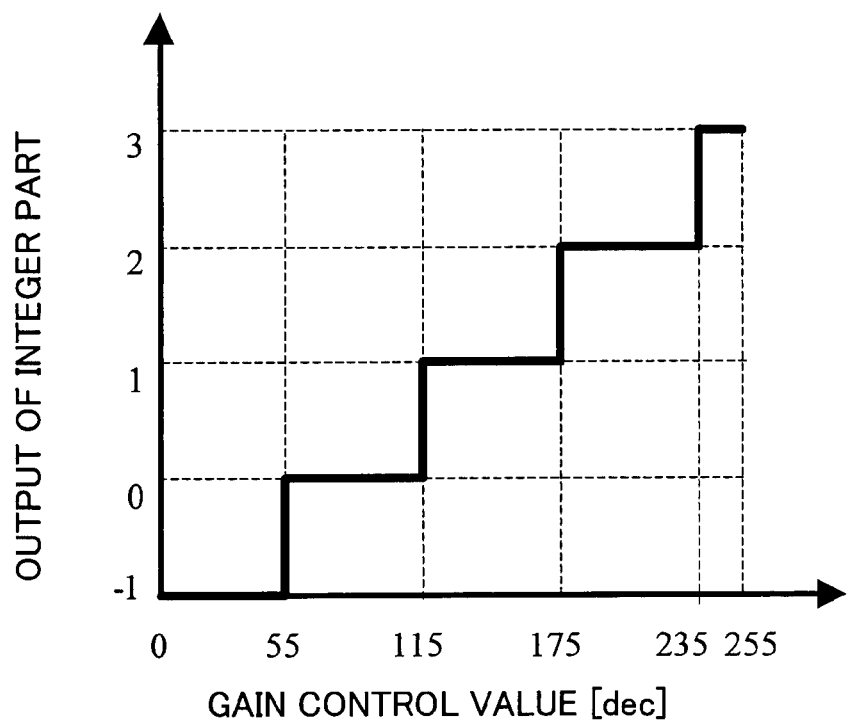
FIGS. 7(a) and 7(b) are diagrams illustrating exemplary output characteristics of a splitting circuit of FIG. 5.
Figure 7B:
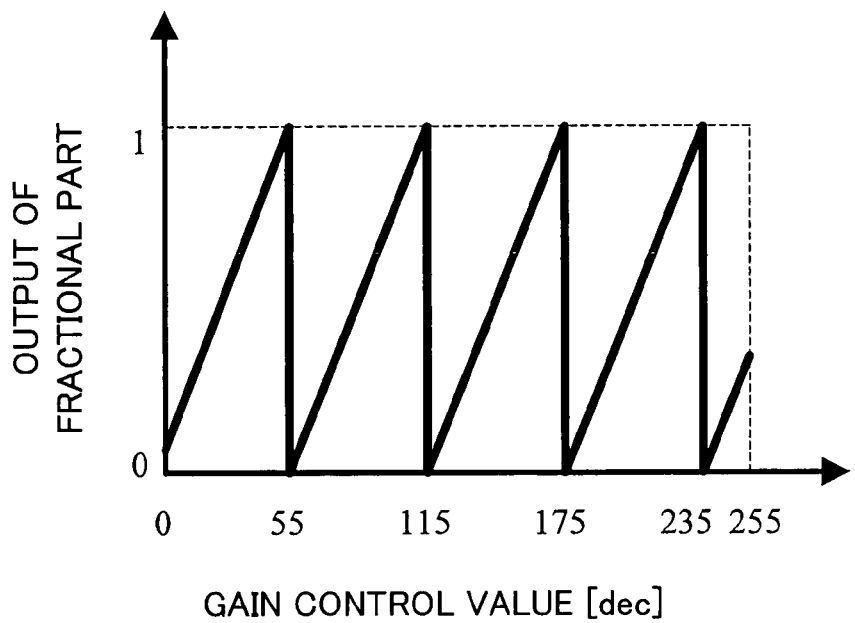

As a more practical configuration, an operation when the set value of the gain tilt correction value 502 is rounded off, i.e., $\log_{10}(2) \approx 60$ [dec], will be described with reference to FIGS. 6, 7(a) and 7(b).

When the gain tilt correction value 502 is set to be 60 [dec], the output of the divider 509 is (xg−55)/60, which provides characteristics illustrated in FIG. 6. Since the output of the divider 509 is separated by the splitting circuit 504 into the integer part and the fractional part, the integer part S504b and the fractional part S504a of the division result of FIG. 6 are those illustrated in FIGS. 7(a) and 7(b). When the fractional part has a value xf, the logarithm table 506 subjects the amplitude information S106 having a value xpa to an amplitude correcting process represented by:

$$xlt = 2^{\wedge}(1-xf) \times xpa$$

where xlt represents the output amplitude of the amplitude information S106.

Figure 8:
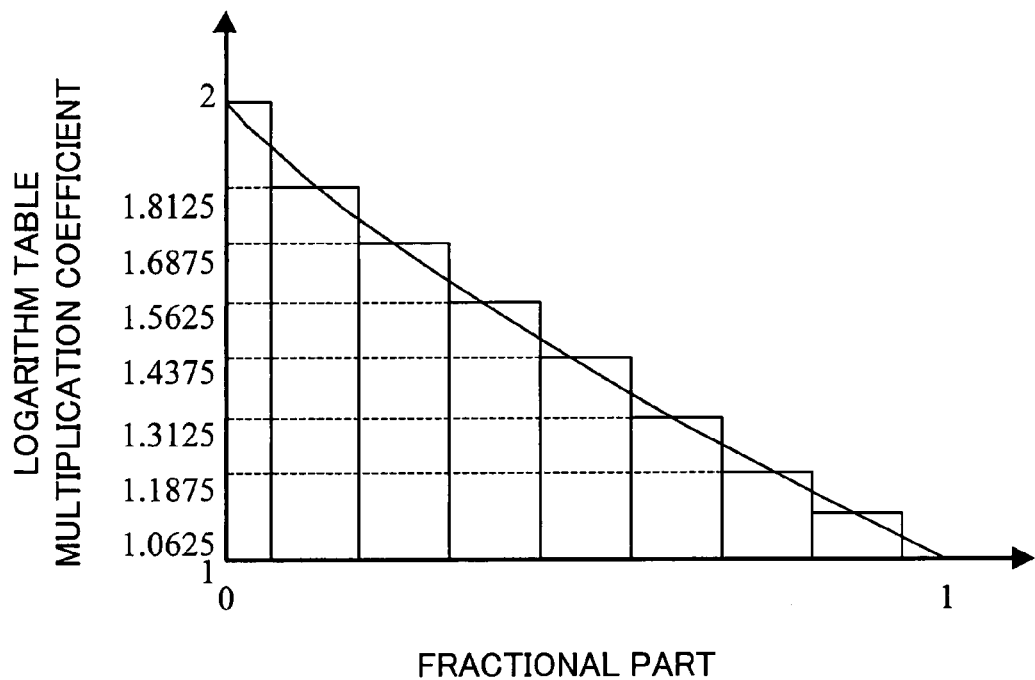
FIG. 8 is a diagram illustrating an exemplary input-output relationship of a logarithm table of FIG. 5.
Figure 9:
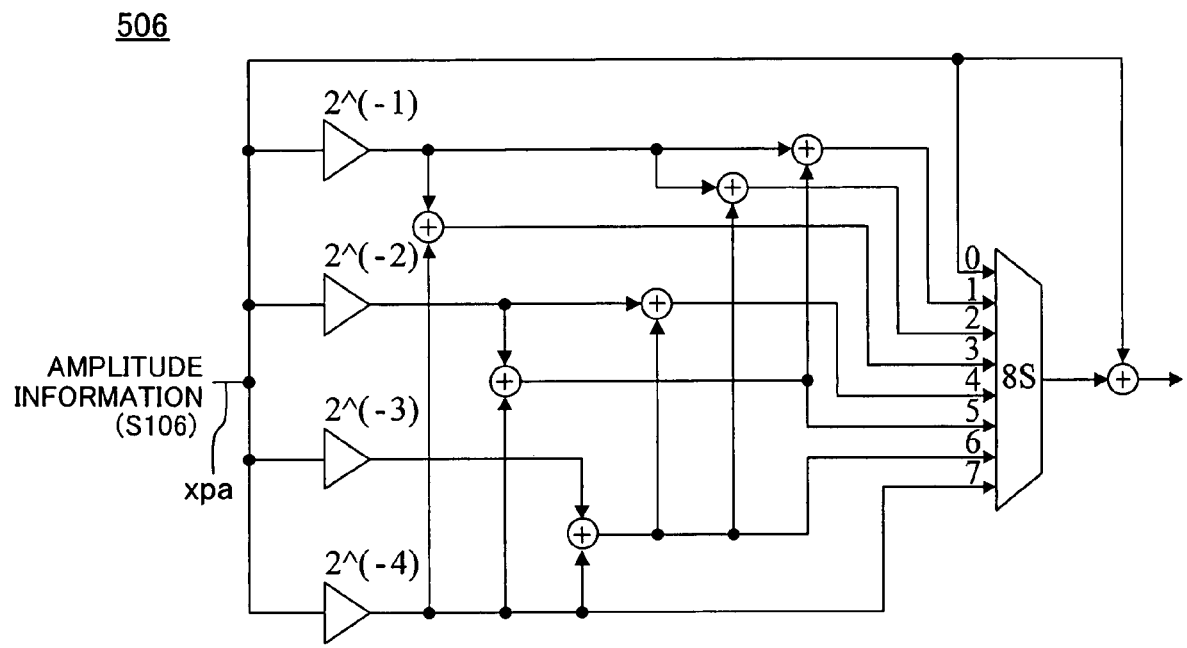
FIG. 9 is a block diagram illustrating an exemplary simple configuration of the logarithm table of FIG. 5.

The characteristics are illustrated with a solid line in FIG. 8. Note that the fractional part xf of the division result is $0 \leq xf < 1$. When the fractional part xf of the division result is expressed by eight levels, a histogram as illustrated in FIG. 8 is obtained. When xf is expressed by eight levels, the resolution is rough. Nevertheless, the logarithm table 506 can be implemented by a configuration as illustrated in FIG. 9, thereby making it possible to suppress the circuit scale. Note that the number of levels of the fractional part can be arbitrarily determined by the designer in view of the circuit scale.

The output amplitude xlt of the logarithm table 506 is further subjected to an amplitude operation by the bit shift operation circuit 507. In the bit shift operation circuit 507, the amplitude operation larger than that of the logarithm table 506 is executed. The amplitude correcting process is represented by:

$$ye = 2^{\wedge}(-(1+xi)) \times xlt$$

$$= xpa/2^{\wedge}(xf+xi)$$

where ye represents the output of the bit shift operation circuit 507, and xi represents the integer part of the division result.

xf+xi is equal to the output result of the divider 509, i.e., (xg−55)/60. Specifically, $$ye = 2^{\wedge}(-(xg-55)/60) \times xpa \approx xp.$$

Even when the gain tilt correction value 502 is rounded off, the amplitude value of the output of bit shift operation circuit 507 is substantially equal to the amplitude value of the output of the pickup 102.

As described above, by providing the envelope generating circuit 107 of Embodiment 1 of the present invention, amplitude information can be extracted even from a signal after the VGA, so that focus position learning can be performed. Also, the configuration of the envelope generating circuit 107 by employing a signal after A/D conversion means that the envelope generating circuit 107 can be comprised of a digital circuit, and therefore, can be provided with lower cost than when the envelope generating circuit 107 is comprised of an analog circuit.

Embodiment 2

Figure 10:
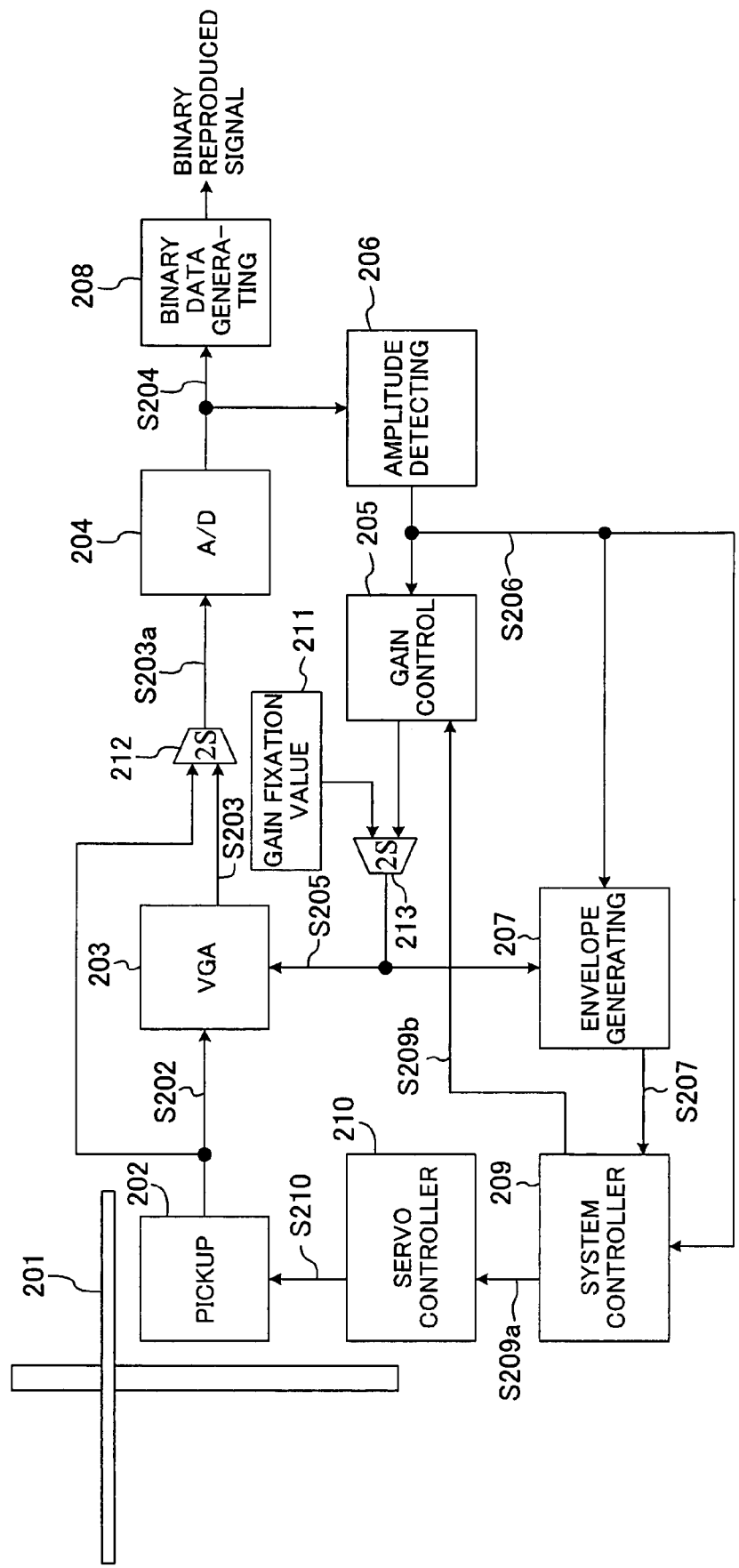
FIG. 10 is a block diagram illustrating a configuration of an optical disc apparatus according to Embodiment 2 of the present invention.

FIG. 10 is a block diagram illustrating an optical disc apparatus according to Embodiment 2 of the present invention. In FIG. 10, the same blocks as those of Embodiment 1 will not be described. A selector 212 for selecting whether a signal to be input to an A/D converter 204 is obtained before or after a VGA 203, a gain fixation value 211 for defining a target value to which a gain control value is fixed, and a selector 213 for selecting one of the gain fixation value 211 and the output of a gain control circuit 205 as a gain control value to be added to the VGA 203 are added to the blocks of Embodiment 1.

Figure 11:
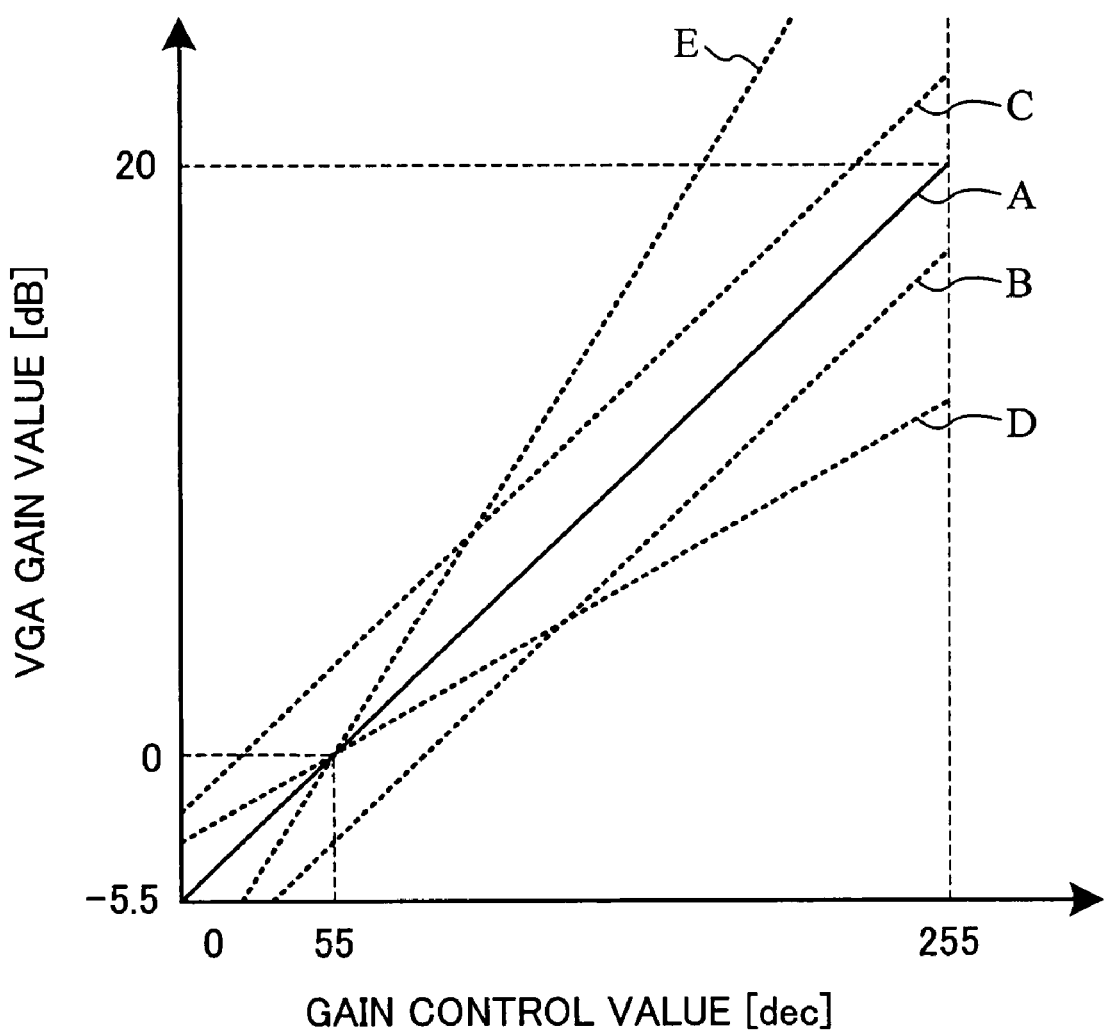
FIG. 11 is a diagram illustrating how transfer characteristics of a VGA of FIG. 10 vary.

FIG. 11 is a diagram illustrating exemplary transfer characteristics of the VGA 203. A indicates a design target of the transfer characteristics, B indicates characteristics which are offset in a direction which decreases the gain with respect to A, and C indicates characteristics which are offset in a direction which increases the gain with respect to A. D indicates characteristics whose slope is reduced, and E indicates characteristics whose slope is increased.

In FIG. 10, the VGA 203 is comprised of an analog circuit. Therefore, even when the circuit is designed so as to target the characteristics of A, the transfer characteristics may be changed to B to E due to an influence of a variation in element, or the like. Particularly, the variation tends to be increased with a reduction in the cost of the analog circuit. When the transfer characteristics are changed to B to E from the design target of A, it is not possible to set an optimum unity gain control value 501 and gain tilt correction value 502 from values obtained from the characteristics A.

Hereinafter, a method of setting the unity gain control value 501 and the gain tilt correction value 502 when the characteristics of the VGA 203 vary, will be described with reference to FIGS. 10 and 11.

In FIG. 10, initially, the selector 212 selects an output S202 of a pickup 202, and information is extracted from a predetermined area in which data is present on an optical disc medium 201. The information extracted by the pickup 202 is transferred via the selector 212 and is input as an input S203a to the A/D converter 204. S203a is converted into digital by the A/D converter 204, and amplitude information S206 is detected by an amplitude detecting circuit 206. Note that the detected amplitude information is equal to an output amplitude of the pickup 202. The amplitude information S206 is read by a system controller 209, and is held as amplitude information of the pickup 202.

Next, the selector 212 is set so as to select the output of the VGA 203 as the input of the A/D converter 204, and the selector 213 is set to select the gain fixation value 211 as a gain control value S205 for controlling the VGA 203. As is similar to the case where the selector 212 is set so as to select the output of the pickup 202, the signal S202 is extracted from a predetermined area in which data is present on the optical disc medium 201. The signal S202, whose amplitude is increased or decreased by the VGA 203, is transferred via the selector 212 to the A/D converter 204. Note that the increase or decrease amount of the amplitude is determined by the gain fixation value 211 via the selector 213. From information converted into digital by the A/D converter 204, the amplitude information S206 when the signal S202 has been transferred via the VGA 203 is detected by the amplitude detecting circuit 206, and is read by the system controller 209. The amplitude of the VGA 203 is compared with the previously held amplitude information of the pickup 202. When the amplitude of the VGA 203 is larger than the previously held amplitude information of the pickup 202, the gain fixation value 211 is adjusted so that the signal is attenuated by the VGA 203. On the other hand, when the amplitude of the VGA 203 is smaller, the gain fixation value 211 is adjusted so that the signal of the VGA 203 is amplified. By repeatedly executing the above-described operation, a gain fixation value 211 which is equal to the held amplitude information of the pickup 202 is searched for. If the eventually found gain fixation value is used as the unity gain control value 501, the offset variation of the VGA 203 can be absorbed.

After the unity gain control value 501 is obtained, the gain fixation value 211 is shifted in a direction which increases the signal of the VGA 203, and the amplitude information S206 successively detected by the amplitude detecting circuit 206 with respect to the gain fixation value 211 is read by the system controller 209. The read amplitude information S206 is compared with the amplitude value of the pickup 202 held by the system controller 209. By obtaining a gain fixation value 211 when the difference is 6 [dB], gain tilt characteristics of the VGA 203 can be measured. If the obtained gain fixation value 211 is used as the gain tilt correction value 502, the tilt of the VGA 203 can be absorbed.

After the unity gain control value 501 and the gain tilt correction value 502 are determined, the selector 212 may be set so as to select the output of the VGA 203 as the input of the A/D converter 204, and the selector 213 may be set so as to select the output of the gain control circuit 205 as the gain control value S205 of the VGA 203. In this case, the same operation as that of Embodiment 1 can be executed.

As described above, according to Embodiment 2 of the present invention, by adjusting the characteristics of the VGA, the specification of the VGA 203 can be relaxed. Therefore, the difficulty in designing the VGA 203 which is comprised of an analog circuit can be reduced, thereby making it possible to provide the VGA 203 with low cost. Also, by configuring an envelope generating circuit 207 as in Embodiment 1, amplitude information can be extracted from a signal after the VGA, thereby making it possible to perform focus position learning. Also, the configuration of the envelope generating circuit 207 by employing a signal after A/D conversion means that the envelope generating circuit 207 can be comprised of a digital circuit, and therefore, can be provided with lower cost than when the envelope generating circuit 207 is comprised of an analog circuit.

INDUSTRIAL APPLICABILITY

According to the present invention, an envelope of a pickup is detected from a signal after a VGA, thereby making it possible to provide an envelope generating circuit whose circuit scale is suppressed to a minimum level. Also, by adding a VGA characteristics correcting process, a specification required for the VGA can be relaxed. Therefore, the present invention is useful for configuration of a low-cost optical disc apparatus. The present invention can also be applied to applications, such as magnetic disks and the like.

The invention claimed is:

1. An optical disc apparatus for extracting information recorded on an optical disc medium using a pickup, and detecting an envelope of a signal extracted by the pickup, comprising:
   a VGA for changing an amplitude of the signal extracted by the pickup;
   an A/D conversion means for converting a signal output by the VGA into digital;
   an amplitude detecting means for detecting amplitude information of a signal output by the A/D conversion means;
   a binary data generating means for generating binary reproduced data from the signal output by the A/D conversion means;
   a gain control means for controlling the VGA so as to cause the amplitude information detected by the amplitude detecting means to be constant; and
   an envelope generating means for generating the envelope of the signal extracted by the pickup from control information output by the gain control means and the amplitude information detected by the amplitude detecting means.

2. The optical disc apparatus of claim 1, further comprising:
   an input signal selecting means for selecting the output of the pickup as an input of the A/D conversion means; and
   a gain control fixing means for fixing a control signal for controlling the VGA.

3. The optical disc apparatus of claim 1, wherein the envelope generating means has transfer characteristics of absorbing characteristics of the VGA.

4. The optical disc apparatus of claim 1, wherein the envelope generating means includes:
   a unity gain control value holding means for setting a VGA control value for causing the VGA to have a gain of one;
   a gain tilt correction value holding means for setting a slope of transfer characteristics of the VGA;
   a difference calculating means for calculating a difference between a control signal controlled by the VGA and an output of the unity gain control value holding means;
   a division means for dividing difference information calculated by the difference calculating means by an output of the gain tilt correction value holding means; and
   an envelope operating means for calculating the envelope of the pickup from the amplitude information detected by the amplitude detecting means and a result of the calculation by the division means.

5. The optical disc apparatus of claim 4, wherein the envelope operating means includes:
   a splitting means for splitting the calculation result of the division means into a control value for executing high-precision amplitude correction and a control value for executing low-precision amplitude correction, at a predetermined ratio;

a small amplitude correction means for executing high-precision amplitude correction with respect to the amplitude information detected by the amplitude detecting means, using the control value for executing high-precision amplitude correction, the control value being obtained by the splitting means; and a large amplitude correction means for generating the envelope of the pickup output by executing large amplitude correction with respect to the signal corrected by the small amplitude correction means, using the control value for executing low-precision amplitude correction, the control value being obtained by the splitting means.

6. The optical disc apparatus of claim 5, wherein the splitting means selects the fractional part of the output of the division means as the control value for executing high-precision amplitude correction, and the integer part of the output of the division means as the control value for executing low-precision amplitude correction.

7. The optical disc apparatus of claim 5, wherein the small amplitude correction means executes an operation having a logarithmic scale, the control value for executing high-precision amplitude correction being an input, and the large amplitude correction means executes an operation of raising 2 to the power of n (n is a positive integer), the control value for executing low-precision amplitude correction being an input.

8. The optical disc apparatus of claim 5, the small amplitude correction means includes a table for executing an operation having a logarithmic scale, the control value for executing high-precision amplitude correction being an input, using an operator for raising 2 to the power of n (n is a positive integer) and an adder.

9. The optical disc apparatus of claim 4, further comprising:

means for determining a set value for the unity gain control value holding means and a set value for the gain tilt correction value holding means from amplitude information of recorded information present in a specific area on the optical disc medium extracted by the pickup, and amplitude information obtained by fixing the VGA control value.

10. The optical disc apparatus of claim 9, wherein as the mean for determining the set value for the unity gain control value holding means, a checking means is provided for checking amplitude information obtained by extracting the recorded information in the specific area on the optical disc medium using the pickup, converting the information extracted by the pickup into digital using the A/D conversion means without via the VGA, and reading the amplitude information of the pickup detected by the amplitude detecting means, against amplitude information obtained by controlling an amplitude of a signal extracted by the pickup by fixing the VGA control value, converting the amplitude of the signal into digital using the A/D conversion means, and detecting the amplitude information using the amplitude detecting means, and the VGA control value when the two pieces of amplitude information are equal to each other is set into the unity gain control value holding means.

11. The optical disc apparatus of claim 9, wherein as the means for determining the set value for gain tilt correction value holding means, a checking means is provided for checking amplitude information obtained by extracting the recorded information in the specific area on the optical disc medium using the pickup, controlling an amplitude of the signal extracted by the pickup by fixing the VGA control value, converting the amplitude of the signal into digital using the A/D conversion means, and reading the amplitude information detected by the amplitude detecting means, against amplitude information obtained by controlling an amplitude of a signal extracted by the pickup by fixing the VGA control value to another value, converting the amplitude of the signal into digital using the A/D conversion means, and detecting the amplitude of the signal using the amplitude detecting means, and the VGA control value when the two pieces of amplitude information have a predetermined ratio is set into the gain tilt correction value holding means.

* * * * *